(12) United States Patent
Ortega

(10) Patent No.: US 9,706,787 B2
(45) Date of Patent: Jul. 18, 2017

(54) SYSTEMS AND METHODS FOR DERIVING PROTEIN POWDER

(75) Inventor: Roberto Flores Ortega, Mexico City (MX)

(73) Assignee: Advance International Inc., Livermore, CA (US)

( * ) Notice: Subject to any disclaimer, the term of this patent is extended or adjusted under 35 U.S.C. 154(b) by 624 days.

(21) Appl. No.: 12/639,946

(22) Filed: Dec. 16, 2009

(65) Prior Publication Data

US 2010/0189874 A1    Jul. 29, 2010

Related U.S. Application Data

(63) Continuation-in-part of application No. 11/973,106, filed on Oct. 5, 2007.

(51) Int. Cl.

| | |
|---|---|
| B01J 8/00 | (2006.01) |
| B01J 10/00 | (2006.01) |
| A23J 1/02 | (2006.01) |
| A23J 1/04 | (2006.01) |
| A23J 1/00 | (2006.01) |
| A23L 1/00 | (2006.01) |
| A23J 3/04 | (2006.01) |

(52) U.S. Cl.
CPC . *A23J 1/04* (2013.01); *A23J 3/04* (2013.01); *A23V 2002/00* (2013.01)

(58) Field of Classification Search
CPC ..................................... A23J 1/04; A23J 3/04
USPC .................................. 426/657, 437; 422/187
See application file for complete search history.

(56) References Cited

U.S. PATENT DOCUMENTS

| | | | |
|---|---|---|---|
| 81,987 A | 9/1868 | Cutler | |
| 2,680,754 A * | 6/1954 | Stapelberg | ...................... 554/10 |
| 3,252,962 A * | 5/1966 | Whaley | ...................... A23J 1/04 |
| | | | 426/332 |

(Continued)

FOREIGN PATENT DOCUMENTS

| | | |
|---|---|---|
| CA | 891977 | 2/1972 |
| CN | 1683397 | 10/2005 |

(Continued)

OTHER PUBLICATIONS

Asia-Pacific Fishery Commission, "Bread Formulation," Jun. 1996, Summary Report of and Papers Presented at the Tenth Session of the Working Party of Fish Technology and Marketing, pp. 280-281.*

(Continued)

*Primary Examiner* — Lien T Tran
*Assistant Examiner* — Tynesha McClain-Coleman
(74) *Attorney, Agent, or Firm* — Wilson Sonsini Goodrich & Rosati

(57) ABSTRACT

Systems and methods for producing protein powder are disclosed. In various embodiments, protein powder is prepared by a process comprising sanitizing raw material from aquatic animals mixture with ozone, combining the raw material with a solvent to create a mixture, baking the combined mixture for a first time period, separating, with a filter, liquid from the combined mixture that was baked for the first time period, baking the combined mixture without the separated liquid for a second time period, separating, with a filter, liquid from the combined mixture that was baked for the second time period, curing the combined mixture, and processing the cured mixture to produce protein powder.

8 Claims, 7 Drawing Sheets

(56) References Cited

U.S. PATENT DOCUMENTS

| | | | |
|---|---|---|---|
| 3,520,868 A | | 7/1970 | Henderson et al. |
| 3,649,294 A | * | 3/1972 | Thijssen ............... 426/417 |
| 3,697,285 A | | 10/1972 | Faith, Jr. |
| 3,835,041 A | | 9/1974 | Grant |
| 3,898,745 A | * | 8/1975 | Carlsson ............... 34/332 |
| 4,118,285 A | | 10/1978 | Yeh |
| 4,405,653 A | | 9/1983 | Gray |
| 4,406,831 A | | 9/1983 | Atteck |
| 4,623,488 A | | 11/1986 | Takao |
| 4,707,369 A | | 11/1987 | Suresky |
| 4,797,474 A | | 1/1989 | Patroni |
| 4,871,560 A | | 10/1989 | Brokans |
| 4,888,181 A | | 12/1989 | Gray et al. |
| 5,384,149 A | | 1/1995 | Lin |
| 5,614,102 A | | 3/1997 | Sakurada |
| 6,005,073 A | | 12/1999 | Hultin |
| 6,136,959 A | | 10/2000 | Hultin |
| 6,162,477 A | * | 12/2000 | Crisinel et al. ............ 426/256 |
| 6,190,715 B1 | | 2/2001 | Crowther et al. |
| 6,288,216 B1 | | 9/2001 | Hultin |
| 6,562,952 B1 | | 5/2003 | Rajewski |
| 7,033,636 B2 | | 4/2006 | Kelleher |
| 2002/0128325 A1 | | 9/2002 | Runge |
| 2002/0151733 A1 | * | 10/2002 | Ulrich et al. ............ 554/9 |
| 2003/0215559 A1 | | 11/2003 | Mikaelian |
| 2006/0251793 A1 | | 11/2006 | Junger |

FOREIGN PATENT DOCUMENTS

| | | |
|---|---|---|
| DE | 10160042 | 6/2003 |
| EP | 0280415 A1 | 8/1988 |
| GB | 1156500 | 6/1969 |
| WO | WO 0064567 A1 * | 11/2000 |
| WO | 0220720 A3 | 3/2002 |

OTHER PUBLICATIONS

Stillings et al., "Fish Protein Concentrate: A New Source of Dietary Protein," Aug. 1971, Journal of the American Oil Chemists' Society, vol. 48(8), pp. 412-414.*

PCT International Search Report and Written Opinion of the International Searching Authority for International Application PCT/US2010/060602 (filed Dec. 15, 2010), mailed Feb. 14, 2011 (8 pages).

Bose et al., Coastal Aquaculture Engineering, Great Britain, distributed by Routledge, Chapman and Hall, Inc., 1991, ISBN 0-7131-2947-6, pp. 345 and 350 (3 pages).

English translation of Neumueller DE 10160042, Jun. 2003.

Nuemueller, Machine Translation of DE 10160042, Jun. 2003.

Windsor, M. L., "Fish Protein Concentrate," Nov. 2002, retrieved from the Internet: URL: http://web.archive.org/web/20021118202451/http://www.fao.org/wairdocs/tan/x5917e/x5917e01.htm.

FAO Fishery Industries Division, "The Production of Fish Meal and Oil," Jan. 2007, retrieved from the Internet: URL: http://web.archive.org/web/20070105042516/http://www.fao.org/docrep/003/x6899e/x6899e04.htm.

* cited by examiner

SYSTEMS AND METHODS FOR DERIVING PROTEIN POWDER

CROSS-REFERENCE TO RELATED APPLICATION

The present application is a continuation in part of, and seeks priority to, nonprovisional application Ser. No. 11/973,106, entitled "Method for Deriving a High Protein Powder/Omega 3 Oil and Double Distilled Water From Any Kind of Fish or Animal (Protein)," filed Oct. 5, 2007, now U.S. Pat. No. 8,663,725 which is hereby incorporated by reference herein.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to the derivation of protein powder. More particularly, the invention relates to the derivation of protein powder from aquatic animals.

BACKGROUND OF THE INVENTION

Throughout the centuries, the development of human life has been based upon nutrients and proteins that originate from natural resources. The proteins generated by the food humans consume include animal proteins and vegetable proteins.

Humanity has developed primarily on portions of continents and, secondarily, at the periphery of the oceans. The most widely exploited natural resources are those of the continents. This is a cause of imbalance of the food chain, which, as a result, currently poses great problems and nutritional deficiencies among different populations.

In a 2002 report of the Food and Agriculture Organization of the United Nations (FAO) concerning the insecurity of the food supply throughout the world, the FAO maintained, "progress in the reduction of hunger has virtually stopped." The FAO advised that "unless this tendency is radically reversed, the world will be very far from reaching the goal of the World Food Summit of 1996 to reduce by half the number of people suffering from hunger by the year 2015." In order to reach this goal, the reduction in the number of people suffering from hunger would have to number 24 million each year.

Deriving, from a variety of different sources, protein that may be transported to different people in need may solve many problems associated with lack of nutrition. Humans have benefited from proteins in a medical and nutritional form. Markets have been developed that has given rise to industrialization and commercialization in accordance with the identification of a greater protein potential in some species of fish. Unfortunately, industrialization and commercialization has resulted in the specific exploitation of classified groups of fish, which has placed the biologic balance in danger.

There is a large variety of marine animals, continental and oceanic, which have formed part of the food chain. From the nutritional point of view, fish are classified according to oil content and are divided into lean, semi-oily, and oily fish. For example, in white fish or lean fish, the oil content does not typically pass 2.5%. Hake, monkfish, sole, and dory are some examples of whitefish. The lowest index is found in codfish, with an oil content of about 0.25%. Semi-oily fish have a concentration of oils greater than 2.5% without passing 6%. Sea bream, mullet, gold bream, and bass are some examples of semi-oily fish. Oily fish may have a concentration of oil as high as 10%. Fish that have a high concentration of oils are known popularly as blue fish. Examples of oily fish include sardines, boguerón, mackerel, palometa, blue jack mackerel (chicarro), tuna, northern bonita, salmon, eel and swordfish. The oil of blue fish is rich in polyunsaturated fatty acids and is comprised, among other things, of Omega 3 fatty acids. The concentration of lipids also varies greatly from one species to another. For example, some species of fish live in deep zones and, as they do not migrate, they do not have a need to accumulate oils.

The recommended total consumption of protein (meat, fish, or other) is 15% of daily caloric intake, or 0.8 gram per kilo of weight. As in the case of meat, eggs, and milk, fish contribute protein containing all the essential amino acids. It is estimated that 35 grams of consumption a day of pure protein would satisfy an organism's aminoacids requirements like a full meal.

Protein found in fish contains all of the amino acids essential to humans, and for this reason, fish protein is of very high nutritional value. Fish is easily digested and is relatively low in calories. The lipids found in blue fish have been associated with a series of beneficial effects related to the prevention of myocardial heart attacks and arteriosclerosis.

Fish also contain large quantities of vitamins A and D, as well as vitamin E, which afford the protecting effect of an antioxidant. Generally speaking, fish are also a source of vitamins of the B group, specifically B12. Fish are very rich in sodium and potassium, and somewhat less in calcium.

In view of the foregoing, there is a need for a nutritional supplement to fight malnutrition that is high in protein and may be obtained from a wide variety of species of aquatic animals so that certain species of fish are not over-exploited.

SUMMARY OF THE INVENTION

Figure 1:
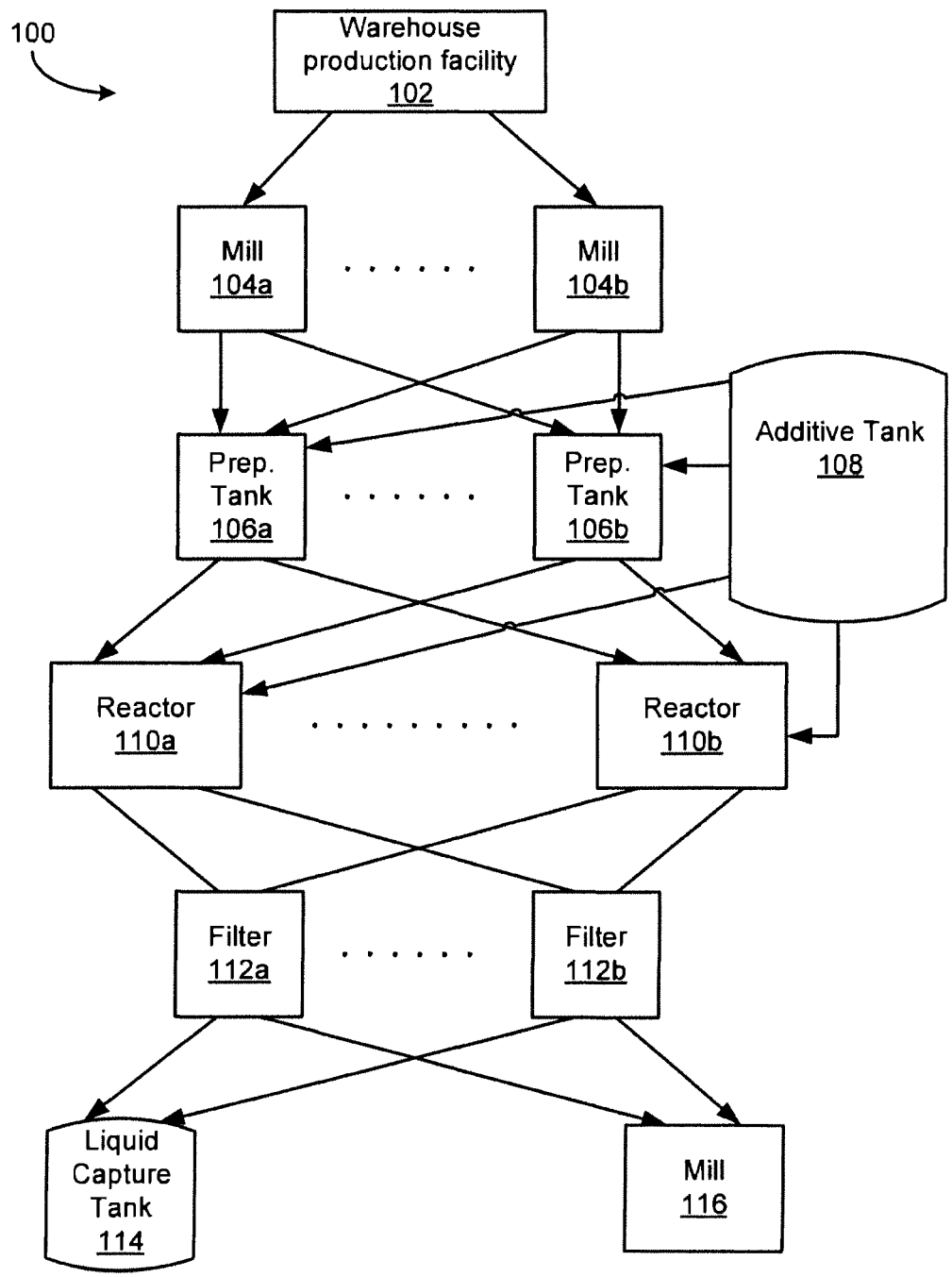
FIG. 1 is a block diagram of an exemplary system for processing of raw material in an embodiment.

Systems and methods for deriving protein powder are disclosed. In various embodiments, protein powder is prepared by a process comprising sanitizing raw material from aquatic animals mixture with ozone, combining the raw material with a solvent to create a mixture, baking the combined mixture for a first time period, separating, with a filter, liquid from the combined mixture that was baked for the first time period, baking the combined mixture without the separated liquid for a second time period, separating, with a filter, liquid from the combined mixture that was baked for the second time period, curing the combined mixture, and processing the cured mixture to produce protein powder.

In some embodiments, the process further comprises baking the combined mixture without the separated liquid for a third time period and separating liquid from the combined mixture that was baked for the third time period. The process may further comprise filtering amine from the liquid separated by the filter.

The process, in some embodiments, may comprise distilling the liquid and filtering at least a portion of the distilled liquid to produce fish oil. Further, the process may comprise separating the liquid by filtering. One portion of the liquid may be distilled. The other portion may be water which may be purified.

The process may comprise adding solvent to the combined mixture prior to baking for the first time period and adding solvent to the combined mixture prior to baking for the second time period. Further, the process may comprise grinding the raw material prior to combining the raw material and the solvent.

The solvent may comprise isopropyl alcohol. In some embodiments, the combined mixture may be baked for a first time period and the mixture rotated. The process may further comprise distilling the liquid to recover the solvent.

In various embodiments, an exemplary method comprises sanitizing raw material from aquatic animals mixture with ozone, combining the raw material with a solvent to create a mixture, baking the combined mixture for a first time period, separating, with a filter, liquid from the combined mixture that was baked for the first time period, baking the combined mixture without the separated liquid for a second time period, separating, with a filter, liquid from the combined mixture that was baked for the second time period, curing the combined mixture, and processing the cured mixture to produce protein powder.

An exemplary system comprises a preparation tank, a reactor, a filter, a mill, and an oven. The preparation tank may be configured to sanitize raw material from aquatic animals with ozone and to combine the raw material with a solvent to create a mixture. The reactor may be configured to bake the combined mixture for a first time period and bake the combined mixture of a second time period. The filter may be configured to separate solvent, oil, water, and amine from the combined mixture after baking in the reactor for the first time and configured to separate solvent, water, and amine from the combined mixture after baking in the reactor for the second time. The mill may be configured to grind the combined mixture. The oven may be configured to cure the ground combined mixture to produce protein powder.

DETAILED DESCRIPTION OF THE PREFERRED EMBODIMENTS

A large number of different types of aquatic animals may be used to form the basis of raw material. Discussed herein are systems and methods for deriving protein powder from the raw material.

A solvent may be added to the raw material during processing. In some embodiments, the solvent may be extracted for later reuse. Further, fish oil, such as Omega 3 fish oil, may be extracted. Moreover, water may be extracted from the raw material as well. In some embodiments, exemplary systems and methods described herein derive protein powder, fish oil, and water from the raw material.

The protein powder may be a complete aminogram free of fish odor or smell (e.g., amine free). The protein powder may also be hydroscopic and sterile.

Further, the raw material may be derived from a variety of fish. By using a wide variety of different types of aquatic animals to meet current protein, oil, and water needs, overfishing of limited select resources (e.g., certain species of salmon) are avoided while the protein needs of many people may be met.

FIG. 1 is a block diagram of an exemplary system 100 for processing of raw material in an embodiment. In some embodiments, protein powder may comprise 85% or more of the protein that may be separated from the raw material.

Various embodiments discussed herein obtain protein, minerals, omega 3 oils, and/or distilled water from aquatic animals. By way of example, if a large tuna fish of 10 kilos is processed, 2 kilos of pure protein with complete amino gram may be obtained. If a skinny chip fish of 4 kilos is processed, 1 kilo of pure protein worth the complete amino gram may be obtained. The skinny chip fish, however, may produce less oil per volume of protein. The quality of the protein is generally not different between the two fish. Various embodiments may use any and all parts of even waste aquatic animals as long as the aquatic animals are fresh. For example, all part of a fish including the head, viscera, bones, cartilage, tissue etc, may be used. It should be noted that health benefits from the fish's other body parts may also be present in products of some embodiments.

In various embodiments, any kind of aquatic animal may be used as raw material. By using fewer over-exploited aquatic animals, systems and methods described herein may provide a means of avoiding the over exploitation of better-known species, including, for example, sardines, tuna, and salmon shark, robalo, shrimp, octopus, and squid.

A large percentage of the catch from fisherman is not commercial. Often the fisherman throws back fish because there is not a buyer for that kind of fish. Since a wide variety of different kinds of fish and aquatic animals may be used as the basis for the raw material from which the protein powder is obtained, endangered species of fish may be avoided.

An exemplary process uses the whole aquatic animal (e.g., whole fish), using solvents at different stages. The process may be on a closed circuit; for example, solvents may be recovered in order to use the recovered solvents again. The result of the process may be a high-quality protein with the complete amino gram and mineral concentration made at a low cost.

Figure 5:
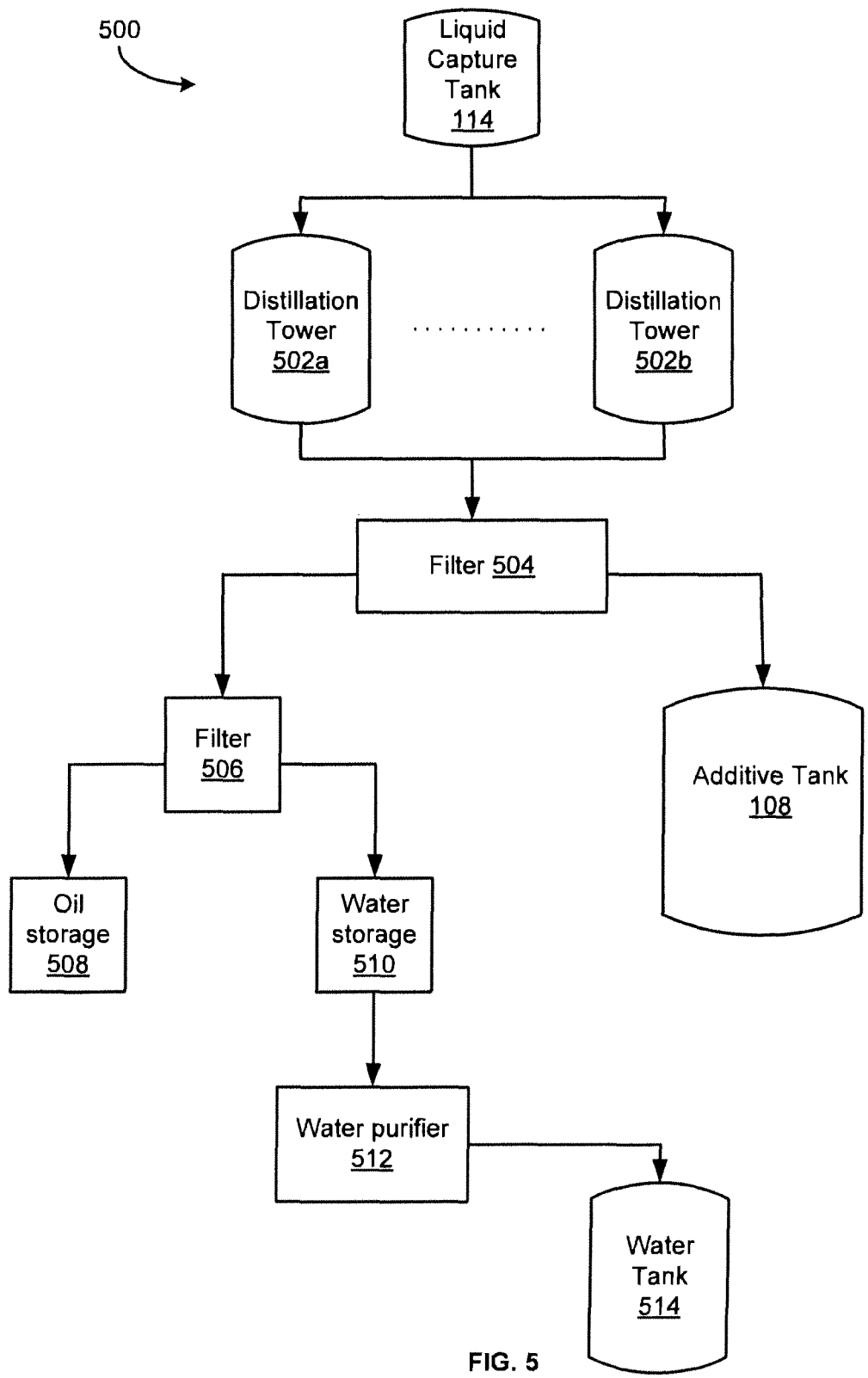
FIG. 5 if a block diagram of an exemplary system for the production of oil, production of water, and the recovery of an additive in an exemplary embodiment.

In various embodiments, the system depicted in FIG. 1 may be part of a larger system for producing protein powder, oil, and water, from raw material (e.g., fish and/or other animals). In an example, FIGS. 1 and 3 display an exemplary system for producing protein powder from the raw material. FIGS. 1 and 5 display an exemplary system for retrieving oil (e.g., Omega 3 fish oil) and water from the raw material.

The exemplary system 100 for processing of raw material comprises a warehouse production facility 102, mills 104a-b, preparation (e.g., prep.) tanks 106a-b, an additive tank 108, reactors 110a-b, filters 112a-b, a liquid capture tank 114, and a mill 116. Although FIG. 1 depicts two mills 104a-b, preparation tanks 106a-b, reactors 110a-b, filters 112a-b those skilled in the art will appreciate that there may be any number of mills 104a-b, preparation tanks 106a-b, reactors 110*a-b*, and filters 112*a-b*. Similarly, although only one warehouse production facility 102, additive tank 108, liquid capture tank 114, and mill 116 is depicted, those skilled in the art will appreciate that there may be any number of warehouse production facilities 102, additive tanks 108, liquid capture tanks 114, and mills 116.

The raw material for the process is stored in a warehouse production facility 102. In some embodiments, the warehouse production facility 102 includes a refrigeration system to prevent decomposition of the raw material. The warehouse production facility 102 may have any amount of capacity. In one example, the warehouse production facility 102 may store 3,000 tons of bulk fish (e.g., raw material). In some embodiments, the warehouse production facility 102 may include one or more disposal areas to dispose of bulk fish that are sufficiently fresh as well as one or more scales for weighing the raw material prior to processing.

Mills 104*a-b*, may be any kind of mill configured to physically break down (e.g., grind or crush) the raw material from the warehouse production facility 102. In some embodiments, the mills 104*a-b* grind the raw material to approximately ¼ inch pieces. Those skilled in the art will appreciate that the raw material may be broken down to any size pieces using any type of device. In some embodiments, the raw material in the warehouse production facility 102 is evaluated for quality and weighed. Predetermined amounts of raw material may then be placed within each mill, respectively. The weighing of the raw material may happen before grinding, after grinding, or both before and after grinding.

Preparation tanks 106*a-b* are any tanks that receive the milled raw material from the mills 104*a-b*. The preparation tanks 106*a-b* may comprise a blending system. In some embodiments, the preparation tanks 106*a-b* may rotate in order to agitate raw material and/or be sealable so that air may not escape the tanks.

In various embodiments, if the characteristics of the raw material are different, milled raw material may be placed inside a preparation tank 106*a* which may be subsequently sealed. Optionally, ozone may be pumped into the tank in order to sanitize the raw material. In one example, ozone is pumped into the preparation tank 106*a* until the pressure within the preparation tank 106*a* reaches approximately 20 psi. The preparation tank 106*a* is mixed for a period of time (e.g., 40 minutes) to homogenize the raw material and/or increase exposure of the raw material to the ozone. In one example, the preparation tank 106*a* is rotated at approximately 50 to 60 rotations per minute (rpm).

Additives may be added either before or after the ozone is pumped into the preparation tanks. Additives may include, but not limited to, a solvent. The additive may also include other materials and/or chemicals. In some embodiments, the preparation tanks have a minimum capacity of 30,000 liters each and are each capable of supporting at least 30 tons of weight.

The additive tank 108 is a tank that holds additives to be mixed with the milled raw material in the preparation tanks 106*a-b* and/or the reactors 110*a-b*. In one example, the additive tank 108 has a storage capacity of 120,000 liters. In some embodiments, one or more additives, such as a solvent is later recovered (further discussed herein) and added back to the additive tank 108 for later use. Those skilled in the art will appreciate that the additive tank 108 and/or one or more other tanks, may include any kind of additive to add to the raw material.

Reactors 110*a-b* receive the prepared material from the preparation tanks 106*a-b*. The reactors may be any kind of reaction tank. Each reactor 110*a-b* may, in some embodiments, heat and rotate the raw material from the preparation tanks 106*a-b*. In various embodiments, the reactor may heat the raw material and solvent to a predetermined temperature (e.g., 90° C.) for a predetermined period of time. In one example of a reactor, the reactor may be heated from 380° to 450° C. in order to quickly heat the raw material to 90° C. (e.g., via one or more boilers). In some embodiments, the raw material is kept at or below 90° C. to prevent the raw material (or components thereof) from burning. The reactors 110*a-b* may also have one or more thermometers configured to read the temperature of the mixture. The reactor may rotate at speeds from 4,000 to 5,000 rpm. Those skilled in the art will appreciate that the reactor may rotate at any speed (e.g., 2000 rpm).

In some embodiments, each of these reactors 110*a-b* has a capacity of at least 20,000 liters, and each is capable of supporting at least 20 tons. The material inside the reactor 110*a-b* may further receive additional additives (e.g., additional solvent). In one example, solvent is added to the raw material in a ratio of 2 parts solvent to 1 part raw material. Once completed, the material in the reactor forms a reactivated mixture. In some embodiments, the heat of the reactors and/or the solvent may further sanitize the milled raw material.

In various embodiments, each of the reactors 110*a-b* comprise a blending system to homogenize the mixture prepared with the additives coming from the additive tank 108. Further, the reactors 110*a-b* may comprise one or more pumps to pump the reactivate mixture from the reaction tanks 110*a-b* to the filters 112*a-b*. The reactor 110*a* may comprise automatic valves and sensors to monitor the process.

In some embodiments, a magnetic field is applied to align molecules of the solvent and raw material mixture in the reactor. The alignment of the molecules may, in one example, improve the function of the solvent and/or the process of separating out liquids (e.g., amine, solvent, water, and oil) from the rest of the raw material. Electricity may also be applied to the solvent and raw material mixture for the same or similar purpose.

Once the solvent and milled raw material is placed in the reactor 110*a*, the mixture may be heated and rotated for a predetermined period of time. In one example, heat and a magnetic field are applied to the solvent and milled raw material for five minutes at thirty minute intervals for two hours.

In various embodiments, the quality of the protein powder is not degraded as the process is low temperature thus not burning or degrading the protein and keeping the organoleptic structure intact. This may result in a relatively complete if not complete amino gram of high quality concentration of protein on the final product.

Filters 112*a-b* filter the reactivated mixture to separate out solids from liquids. In some embodiments, filters 112*a-b* are centrifuges. In one example, a centrifuge may rotate at 2,000-3,000 rpm. In other embodiments, the filters 112*a-b* may be any kind of filter, strainer, or combination (e.g., combination of filters, strainers, and/or centrifuges). In one example, the filters 112*a-b* separate out 70% of the liquids from the raw material. In one example, the filters 112*a-b* are a fine mesh for separation of solid materials from solvent-soluble materials.

In some embodiments, the filters 112*a-b* comprise centrifuges that operate in a vacuum. In one example, fumes from the solvent may be recovered during filtering. Solvent may be recovered from the fumes and stored for later use (e.g., the solvent may be recovered and stored in the additive tank 108).

After filtration, the reactors 110*a-b* may receive the solid material from the filters 112*a-b*, for further processing. Subsequently, the filters 112*a-b* may re-filter the reactivated material and extract more liquid. The filters 112*a-b* may, in some embodiments, have the ability to extract at least 21,000 liters of liquids per hour. In various embodiments, each time the reactors receive material (e.g., either from the preparation tanks 106*a-b* or the filters 112*a-b*) additive(s) such as solvent(s) may be added to the material from the additive tank 108.

In some embodiments, the material is reactivated in the reactors 110*a-b* and filtered by the filters 112*a* three times. In other embodiments, the material is reactivated in the reactors 110*a-b* and filtered by the filters 112*a* five times. Those skilled in the art will appreciate that the material may be reactivated in the reactors 110*a-b* and filtered by the filters 112*a* any number of times The liquid capture tank 114 is any tank that receives liquids (e.g., heavy liquids) from the filters 112*a-b*. The liquid in the tank may comprise additive(s) (e.g., solvent(s)), oil, water, and amine. The additives may be recovered from the liquid (as further described herein). Further, oil (e.g., Omega 3 oil) and purified water may be obtained from the liquid. In some embodiments, amines in the liquid are later removed or reduced in order to reduce or eliminate fishy smell or taste from the oil and water. Those skilled in the art will appreciate that the liquid removed from the raw material may comprise any components beyond solvent, oil, water, and amine. In one example, the liquid may comprise salt which may be later removed (e.g., via distillation).

The mill 116 is any mill that may break, grind, and/or crush material from the filter 112*a-b*. In one example, the material passed between the reactors 110*a-b* and the filters 112*a-b* three times before the mill 116 receives the remaining solids from the filter 112*a-b*. In one example, the mill 116 may further grind the material to $\frac{1}{8}^{th}$ inch pieces. Those skilled in the art will appreciate that the mill 116 may grind the material to any size.

Figure 3:
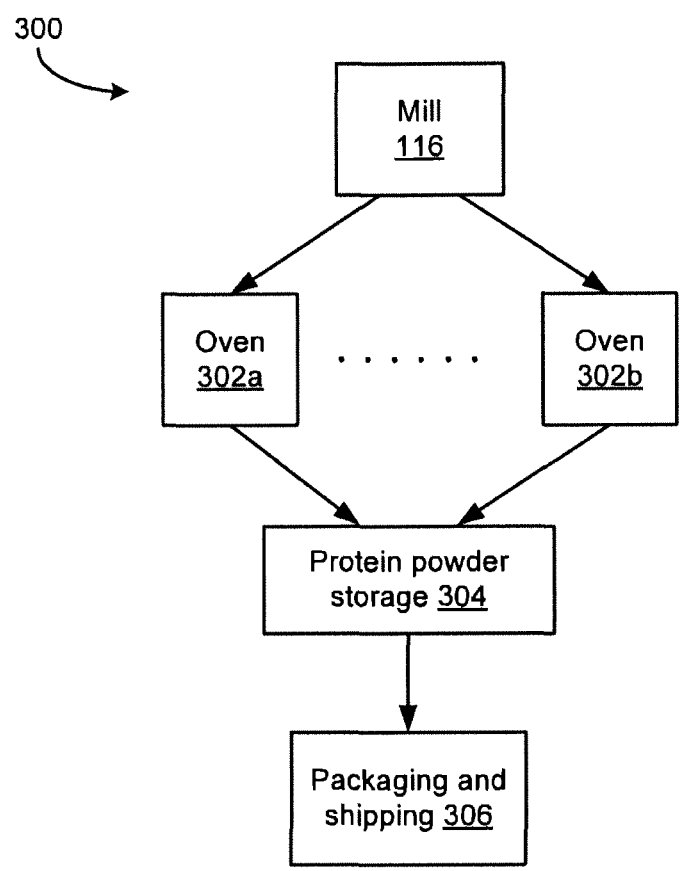
FIG. 3 is a block diagram of an exemplary system for the derivation of protein powder in an embodiment.

It will be appreciated by those skilled in the art that the system 100 and system 300 depicted in FIGS. 1 and 3, respectively, may include redundant systems to allow for one or more components to break or maintenance to be performed. For example, if mill 104*a* requires maintenance, the raw material may be provided through mill 104*b*. Similarly, if preparation tank 106*a* is unavailable, mills 104*a-b* may provide the milled materials to any number of other preparation tanks other than preparation tank 106*a*.

Figure 2:
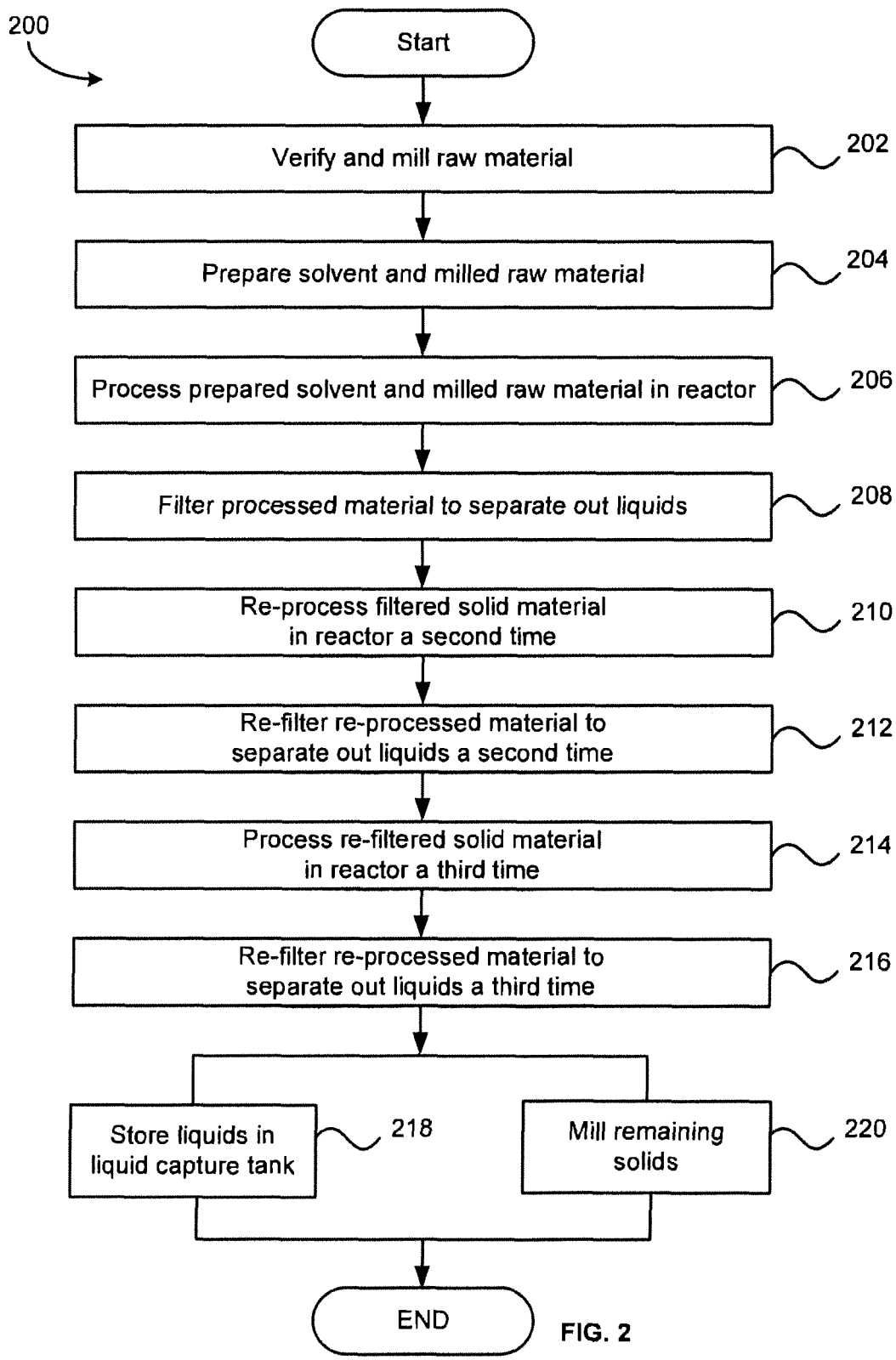
FIG. 2 is a flowchart of an exemplary method for processing the raw material in an embodiment.

FIG. 2 is a flowchart of an exemplary method 200 for processing the raw material in an embodiment. The discussion regarding FIGS. 2, 4, and 6 refer to single components even if two or more of the same component (e.g., mill 104*a-b* in FIG. 1) are depicted in FIGS. 1, 3, and 5. Those skilled in the art will appreciate that although only one component is discussed, any number of components may be used within exemplary systems and methods.

In various embodiments, systems depicted in FIGS. 1 and 3 may have capacity to produce 18 tons of protein powder (e.g., Advanced Protein Powder) and 5,000 liters of fish oil (e.g., omega 3) from 100 tons of fresh fish (e.g., raw material). In various embodiments, the process does not harm the environment with pollutants or toxic fumes.

In step 202, raw material is verified and milled. In some embodiments, the raw material is sorted and raw material that is not sufficiently fresh is disposed. Those skilled in the art will appreciate that the raw material may be sanitized. Further, the raw material may be de-boned, or less desirable material of the raw material may be disposed. The raw material may also be weighed with a scale and apportioned by weight prior to transport to the preparation tank 106*a*.

In various embodiments, the raw material will include any number of aquatic animals of many types. In one example, the raw material includes a limited number of different types of aquatic animals (e.g., salmon, tuna, and sardines only). In another example, the raw material may comprise any number of aquatic animals. Those skilled in the art will appreciate that poison fish may be used without dangerous residues in the finished powder, oil, and water.

In some embodiments, specific type and/or species of fish may be selected based on available protein and/or nutrition content. In other embodiments, the selection of fish is unrelated to protein quality.

In step 204, the preparation tank 106*a* receives solvent and milled raw material to be prepared for the reactor 110*a*. In some embodiments, the milled raw material is combined with ozone to sanitize the milled raw material. In one example, raw material is placed within the preparation tank 106*a* which is sealed. Ozone may be pumped into the preparation tank 106*a* which may then rotate to agitate the milled raw material. After which, solvent may be added to the agitated milled raw material.

In various embodiments, the preparation tank 106*a* receives a solvent such as isopropyl alcohol from the additive tank 108 and blends the solvent with the milled raw material. During preparation, the milled raw material may dissolve to form a viscous liquid.

In step 206, reactor 110*a* processes the prepared solvent and milled raw material. The prepared solvent and milled raw material may receive more solvent and/or other additives from the additive tank 108. In various embodiments, the reactor 110*a* heats (e.g., to 90° C.) and rotates (e.g., at speeds from 4,000 to 5,000 rpm) the prepared mixture for 2 hours. In some embodiments, the typical percentage of material in the reactor 110*a* is two parts milled raw material to 4 parts solvent. Those skilled in the art will appreciate that the reactor 110*a* may heat the prepared solvent and milled raw material at any heat, rotate at any speed, for any length of time.

In step 208, the filter 112*a* filters the processed material from the reactor 110 to separate out liquids. In various embodiments, the filter 112*a* is a decanter which decants the processed material for one hour. The filter 112*a* (e.g., decanter) may store any liquid in the liquid capture tank 114. Remaining solids may be returned to the reactor 110*a*. In some embodiments, at least some of the solvents may be absorbed.

In step 210, the reactor 110*a* re-processes the filtered solid material a second time. In various embodiments, additional additives such as solvent may be added to the filtered solid material prior to processing. In some embodiments, the filtered solid material and additive(s) may be heated (e.g., to 90° C.) and rotated (e.g., at speeds from 4,000 to 5,000 rpm) for two hours.

In step 212, the filter 112*a* re-filters the re-processed material to separate out liquids a second time. Any separated liquids may be stored in the liquid capture tank 114. Remaining solids may be returned to the reactor 110*a*.

In step 214, the reactor 110*a* re-processes the re-filtered solid material a third time. In various embodiments, additional additives such as solvent may be added to the filtered solid material prior to processing. In some embodiments, the filtered solid material and additive(s) may be heated and rotated for two hours.

In step 216, the filter 112a re-filters the re-processed material to separate out liquids a third time. Any separated liquids may be stored in the liquid capture tank 114. Remaining solids may be provided to a mill (e.g., mill 116).

In step 218, the liquid capture tank 114 receives liquids from the filter 112a during steps 208, 212, and 216. In step 220, mill 116 mills the remaining solids received from the filter 506. In some embodiments, the mill 116 grinds the remaining solids and eliminates or reduces remnants of remaining solvents.

Those skilled in the art will appreciate that at one or more filtration steps, filtration may occur with earth material and/or resin ionic exchange to eliminate amines compounds (e.g., odor of the marine animals).

FIG. 3 is a block diagram of an exemplary system 300 for the derivation of protein powder in an embodiment. The exemplary system 300 for the production of protein powder comprises the mill 116 (e.g., see FIG. 1), ovens 302a-b, protein powder storage 304, and packaging and shipping 306. The mill 116 receives the material from the filter 112a-b as discussed regarding FIG. 1.

Ovens 302a-b receive the re-milled material from the mill 116. The ovens 302a-b may then cure the re-milled material from the mill 116. The ovens may be any kind of ovens including vacuum ovens that are configured to heat the milled material from the mill 116 to a temperature of 90° C. which dries the re-milled material. Remaining solvent may be collected from fumes during the curing process. The collected solvent may be stored and reused. In some embodiments, the ovens 302a-b rotate (e.g., at 40 rpm) to agitate the mixture and speed drying.

The protein powder storage 304 is any facility that may receive the protein powder (e.g., Advanced Protein Powder) from the ovens 302a-b. The protein powder storage 304 may be a hopper, silo, or any structure that can store the accumulated cooked and milled solids.

The packing and shipping 306 is any facility that may receive the protein powder from the protein powder storage facility 304 and package and/or ship the protein powder.

Figure 4:
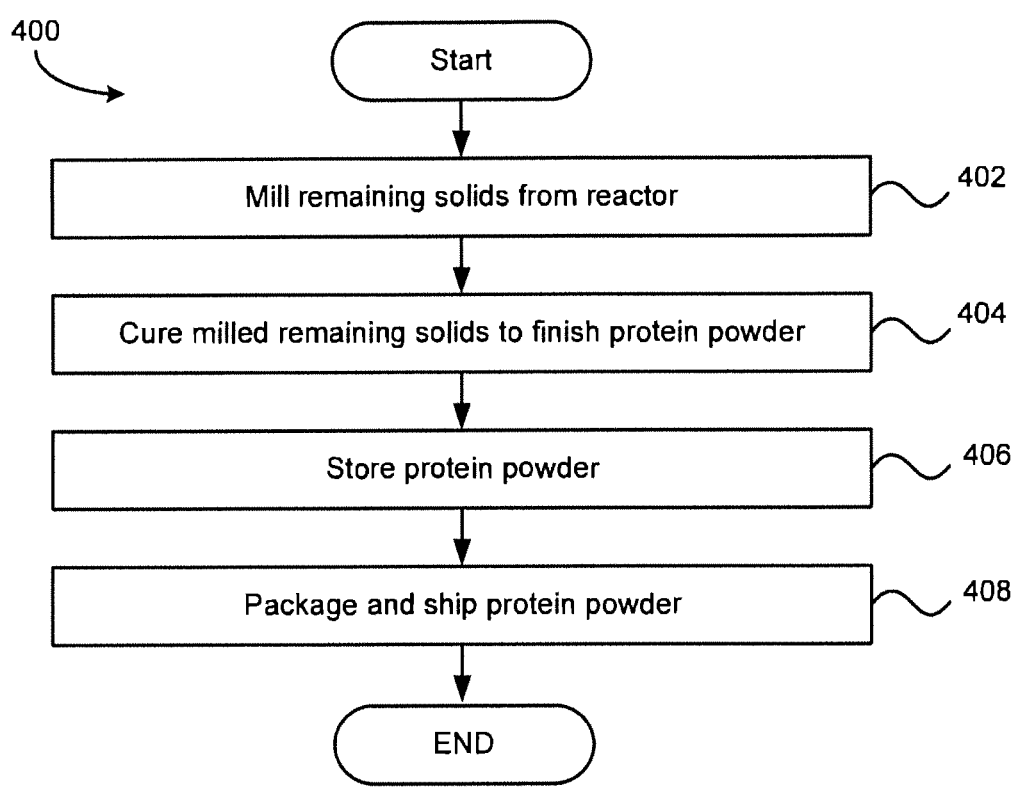
FIG. 4 is a flowchart of an exemplary method for the derivation of protein powder in an embodiment.

FIG. 4 is a flowchart of an exemplary method 400 for the derivation of protein powder in an embodiment. In step 402, the mill 116 receives and grinds the solids from the filter 112a. In step 404, the oven 302a cures the milled remaining solids from the mill 116 to finish protein powder. In some embodiments, the oven 302a is a vacuum oven and the time of drying is 8 hours per load.

In step 406 the protein powder is stored in the protein powder storage 304. In some embodiments, final processing or finishing of the protein powder may be performed at the protein powder storage 304. In one example, the protein powder may be bleached to make the color of the protein powder more attractive and to whiten the protein powder so as to limit the negative impact of adding the protein powder to other foods. In another example, the protein powder may be further ground (e.g., to a flour like consistency).

The protein powder may be pressed into a solid pill form, placed in a capsule to be swallowed, or added to a liquid to be drunk. The protein powder may have a concentration of 85-90%, a transfatty acid content of 0.02%, cholesterol of 0.01%, 120 calories per each 30 gram serving, and is 98.1% digestible. The specific nutritional values in the protein powder created by an exemplary process are shown in the certificate of analysis in TABLE 1, TABLE 2, TABLE 3, and TABLE 4.

In some embodiments, the protein powder may have a lifetime or near-lifetime shelf-life because the protein powder may be non-hydroscopic (e.g., the protein powder does not absorb humidity or grow any bacteriological processes). The protein powder may also be chemically balanced so the protein powder does not change in quality concentration over time.

The protein powder may be both stable and sterile. In various embodiments, the product exceeds FDA requirements for a supplement and is an excellent product for world food needs. As can be seen in the Tables, the 35 gram serving of exemplary protein powder may provide sufficient protein to meet a person's amino acid requirement like a full meal.

For example, some FDA regulations specify that a minimum of 75% of protein and 500 parts per million of solvents, with a maximum of 5% humidity and 1.5 of fat or oil.

In one exemplary protein powder, an analysis indicates:
no more than 2.9% of humidity;
no more than 500 parts per million;
no more than 0.05% of fat or oil;
no noticeable odor;
no noticeable smell;
no less than 80% of protein; and
no measurable bacteria.

The difference between vegetables protein aminogram from animal is that the vegetables aminogram is not complete like the animal. In some embodiments, the protein powder described herein has desirable and unique characteristics including a fine powder cream color, is easy to mix with any type of food or supplement, is non-hydroscopic, and/or is sterile.

In step 408, the protein powder is packaged and shipped from the packaging and shipping facility 306.

FIG. 5 if a block diagram of an exemplary system 500 for the production of oil, production of water, and the recovery of an additive in an exemplary embodiment. The system 500 comprises a liquid capture tank 114 coupled with distillation towers 502a-b. The distillation towers 502a-b are coupled to filter 504. The filter 504 separates out and stores at least some additive in additive tank 108 (see also FIG. 1). The filter 504 may also be coupled to filter 506 which receives liquids. The filter 506 is coupled to an oil storage 508 and a water storage 510. The water storage 510 is further coupled to the water purifier 512 which is coupled to the water tank 514.

In some embodiments, a filter of mineral and/or soils is coupled between the liquid capture tank 114 and the distillation towers 502a-b. In one example, liquids from the liquid capture tank 114 are filtered before passing through the distillation towers 502a-b. In various embodiments, the minerals and/or soils absorb amine from the liquid. Those skilled in the art will appreciate that many materials and/or soils may be used to absorb amine.

Although distillation towers 502a-b depict two distillation towers, those skilled in the art will appreciate that there may be any number of distillation towers. Similarly, although only one liquid capture tank 114, filter 504, filter 506, oil storage 508, water storage 510, water purifier 512, and water tank 514 is depicted, those skilled in the art will appreciate that there may be any number of liquid capture tanks 114, filters 504, filters 506, oil storages 508, water storages 510, water purifiers 512, and water tanks 514.

In various embodiments, the liquid capture tank 114 has a storage capacity of 40,000 liters and serves the purpose of capturing the heavy liquids that are extracted from the reactivated mixture from filters 112a-b. In some embodiments, the liquid capture tank 114 transfers to liquid to another liquid capture tank (not depicted). In one example, the other liquid capture tank has a capacity of 120,000 liters and serves the purpose of storing the heavy liquids.

Distillation towers 502a-b may be any distillation unit that distills liquids received from the liquid capture tank 114 and/or any other liquid capture tank. Although the distillation towers 502a-b is characterized as a tower, the distillation towers 502a-b may be any device that can distill liquids. In one example, a distillation tower 502a-b may comprise different plates that allow different material to pass through. For example, oil may collect on a first plate and water may collect on a second plate.

In various embodiments, solvent, water, and oil are separated by evaporation and reflux compensation in the plate column semi-packed (e.g., a distillation tower or unit). Through this process solvent, oil, and waste water may be retrieved. In some embodiments, a charcoal filter may be used to extract other pollutants from the solvent prior to distillation. Those skilled in the art will appreciate that many components and pollutants may be recovered and/or removed from the solvent, water, and oil.

Filter 504 is any filter that may filter and/or otherwise remove one or more additives from the liquid. In some embodiments, the filter 504 filters solvent from the liquid and/or further removes pollutants from the solvent. In one example, the filter 504 filters 85% of the solvent from the liquid. The removed additive(s) are stored in the additive tank 108 where the additive may be added to the preparation tanks 106a-b and/or the reactor 110a-b. The filter 504 may also provide oil and water to the filter 506. Those skilled in the art will appreciate that the filter 504 or function of the filter 504 may be incorporated within the distillation towers 502a-b.

The filter 506 may separate out the oil from the water. Oil from the liquid may be stored in the oil storage 508. The water may be stored in the water storage 510. In one example, the filter 506 is a centrifuge which has a minimum operating capacity for the separation of 3,500 liters per hour, the purpose being to separate the water from the oil coming from distillation towers 502a-b. Those skilled in the art will appreciate that the filter 506 or function of the filter 506 may be incorporated within the distillation towers 502a-b.

The oil storage 508 may be any oil storage tank. In one example, the oil storage 508 has a capacity of 25,000 liters. The water from the filter 506 may be stored in water storage 510. In one example, the water storage 510 has a capacity of 124,000 liters. In some embodiments, the oil may be further processed and/or purified as discussed further herein.

The water purifier 512 purifies the water from the water storage 510. In one example, the water purifier 512 is a distillation tower. The purified water is then stored in water tank 514.

Those skilled in the art will appreciate that one or more components of system 500 discussed herein may be optional. In one example, the water is not purified but rather used in conjunction with boilers to warm the one or more of reactors 110a-b.

Figure 6:
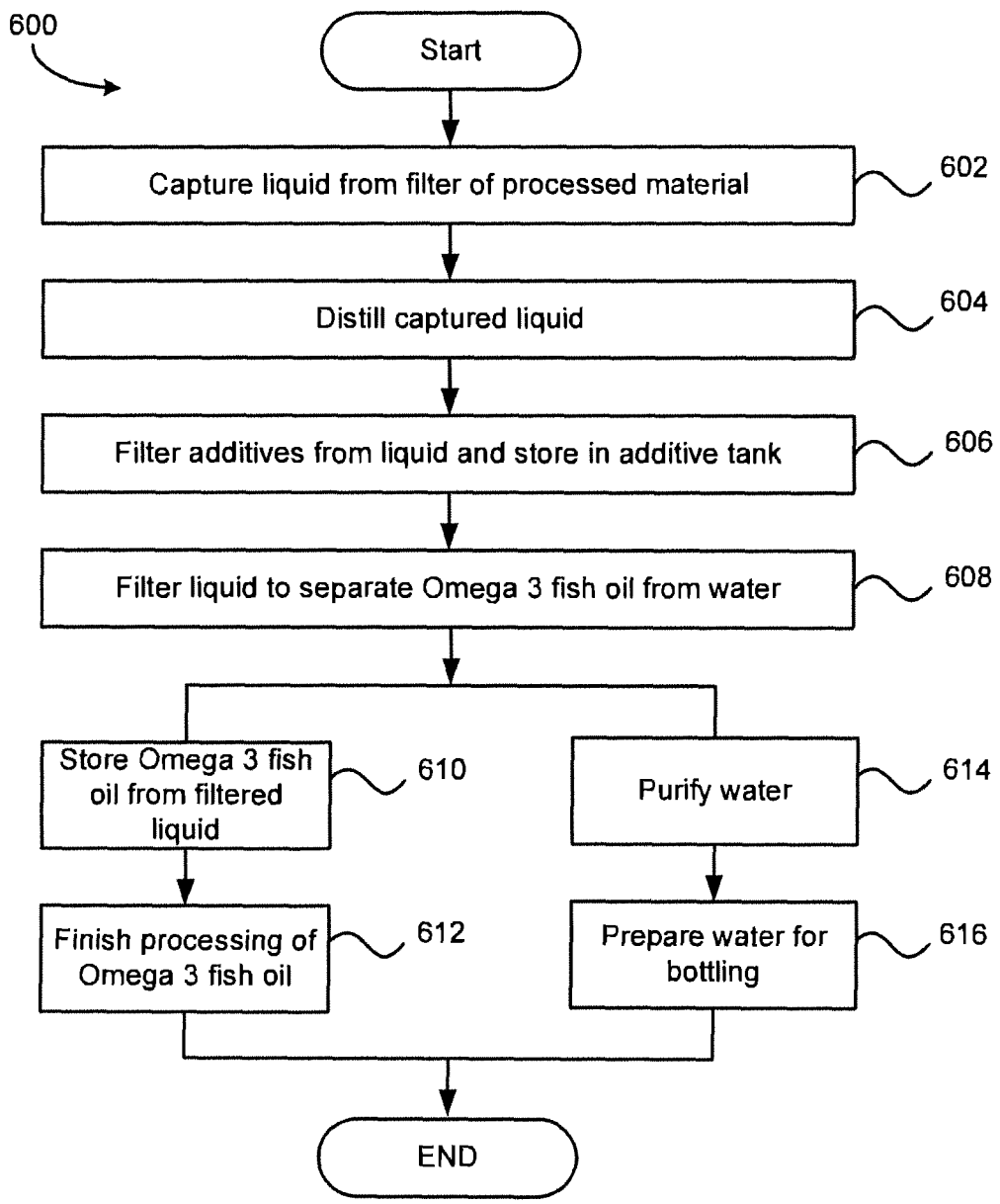
FIG. 6 is a flowchart of an exemplary method for the recovery of oil, water, and additive(s).

FIG. 6 is a flowchart of an exemplary method 600 for the recovery of oil, water, and additive(s). In step 602, the liquid capture tank 114 receives liquids from the filters 112a-b (see FIG. 1). There may be any number of liquid capture tanks 114. In step 604, the distillation tower 502a receives the liquid from the liquid capture tank 114 and distills the liquid for four hours.

In step 604, the captured liquid from the liquid capture tank 114 is distilled by the distillation tower 502a. The captured liquid may be distilled any number of times to separate out water and oil from additive(s) such as solvents from the captured liquid. In some embodiments, the oil and/or solvent may be rectified. The distillation tower 502a, may, in some embodiments, remove all or some of the odor causing chemicals from the oil.

In step 606, the filter 504 filters the distilled liquid to collect additive(s) such as a solvent (e.g., isopropyl alcohol or methylic alcohol) for storage in the additive tank 108. The filter 504 may also filter the distilled liquid to separate out Omega 3 fish oil from water in step 608. Further, in some embodiments, the filter 504 serves the purpose of purifying the additive, so that the additive may later be transferred to additive tank 108.

Those skilled in the art will appreciate that at one or more filtration steps, filtration may occur with earth material and resin ionic exchange to eliminate amines compounds (e.g., to odor of the marine animals). The filtration may occur before the liquids are distilled, after the liquids are distilled, or during distillation.

In step 610, the oil storage 508 stores the Omega 3 fish oil from the filtered liquid. In step 612, the Omega 3 fish oil may be processed prior to shipping. In one example, the Omega 3 fish oil may be processed to lighten the color of the Omega 3 fish oil, prepare the oil for encapsulation, or prepare the oil to be taken orally by adding flavors. Those skilled in the art will appreciate that any kind of processing may be performed.

In step 614, the water purifier 512 purifies water from the filter 506 and in step 616, the water tank 514 receives the water and prepares the water for bottling. The water may be further purified or additives may be added. In some embodiments, the water is bottled for drinking. In other embodiments, the water may be used for non-potable activities.

In various embodiments, the distillation tower 502a and the filter 504 may comprise a retort, distillation column, and condenser for retrieving solvent. The retort may have a boiling point of 60-90° C. with a pressure of 540 to 610 mmHG. the distillation column receives the output from the retort and the condenser receives the output from the distillation column. Ultimately, the condenser outputs solvent that may be used again. In one example, the process may retrieve 85% of the solvent.

Figure 7:
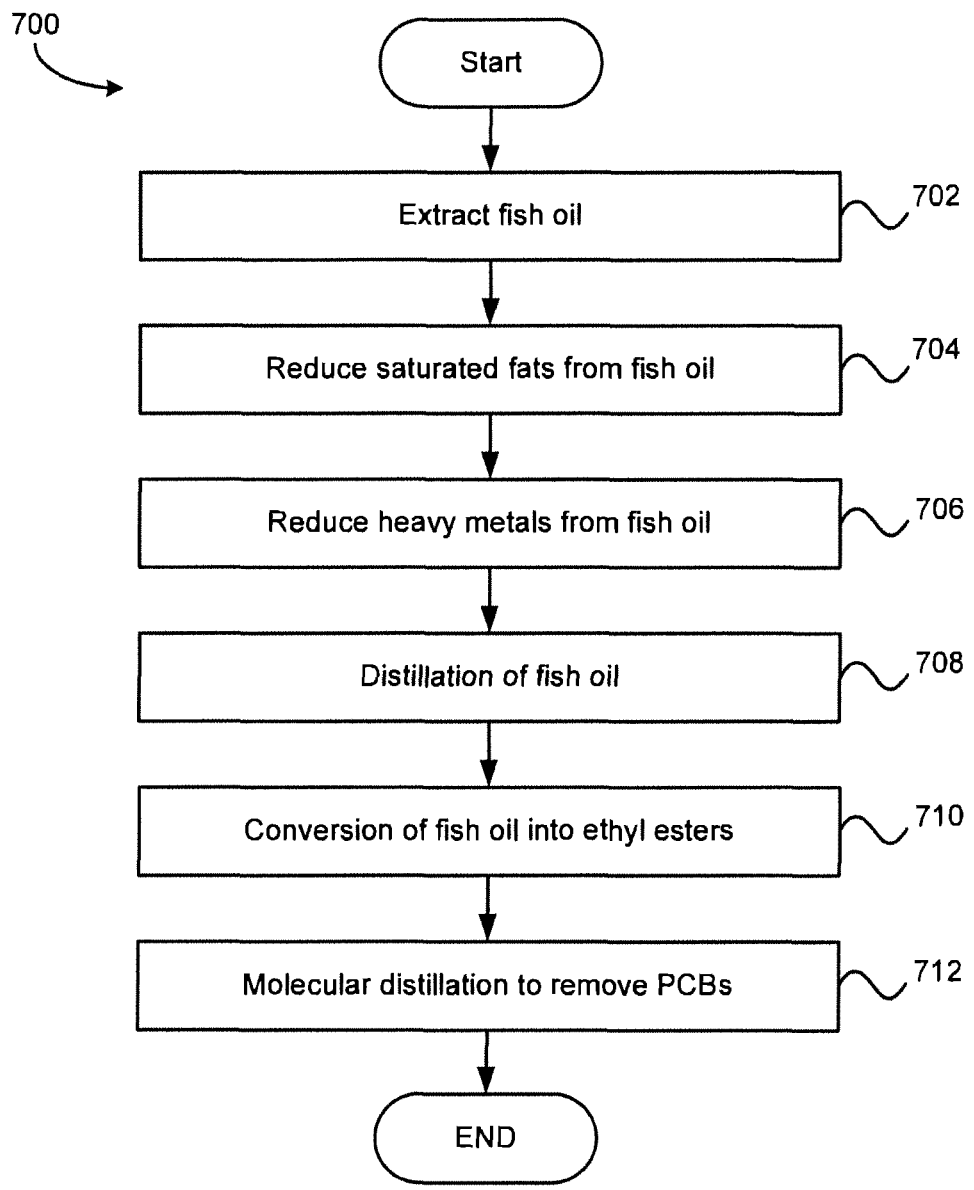
FIG. 7 is a flowchart of an exemplary method for processing of omega 3 oil in an embodiment.

FIG. 7 is a flowchart of an exemplary method 700 for processing of Omega 3 oil in an embodiment. In various embodiments, the Omega 3 fish oils may be purified and concentrated. In step 702, fish oil is extracted to the oil storage 508 as discussed herein.

In step 704, saturated fats may be reduced or eliminated from the fish oil. In one example, saturated fats are reduced or eliminated by winterisation. Winterisation is the process of removing components of the oil with a high melting point. In one example, the oil is cooked gradually and filtered at low temperature. The filter may comprise a centrifuge. In some embodiments, the saturated fats may be reduced or eliminated by cooling the liquid (e.g., by applying nitrogen to the fish oil) and removing the saturated fats that solidify in the oil. Those skilled in the art will appreciate that there are many ways to remove the saturated fats.

In step 706, heavy metals are reduced from the fish oil. In some embodiments, heavy metals are reduced or eliminated during distillation (e.g., via distillation towers 502a-b). In various embodiments, a magnetic field may be applied to the fish oil to remove heavy metals. Further, heavy metals may also be absorbed by a filter within or coupled to one or more distillation towers 502a-b. Those skilled in the art will appreciate that there are many ways to remove heavy metals from the fish oil.

In step 708, the fish oil is distilled (e.g., via distillation towers 502a-b). In some embodiments, the fish oil is distilled to reduce and/or refine pollutants. In one example, the heavy metal discussed in step 706 is a pollutant.

In step 710, the oil is converted into ethyl esters. In step 712, the ethyl esters are heated to further reduce or eliminate saturated fats. In some embodiments, step 710 is optional in view of step 704.

In step 712, molecular distillation to make final polish to remove PCBs (i.e., polychlorinated biphenyl). In on example, the output from step 710 is placed within a distillation unit (e.g., a distillation tower 502a) for distillation to remove and/or eliminate PCBs.

In some embodiments, the oil is converted into ethyl ester. The ethyl ester fatty acids may then be separated from contaminants in a vacuum system to ensure temperatures are well below the oil's normal boiling point (e.g., via a retort). The ethyl ester fatty acids may be isolated utilizing molecular weights leaving behind contaminants. The distilled fatty acids may then be recovered.

In various embodiments, oil refining may be used. In one example, free fatty acids are removed from the oil through neutralization with a base. An absorbent such as a bleaching earth or active carbon may be used to reduce color pigments and contaminants to within acceptable levels. A combination of steam and vacuum may be employed to remove volatile components responsible for the oil's odor and flavor.

Those skilled in the art will readily recognize, in accordance with the teachings of the present invention, that any of the foregoing steps and/or system modules may be suitably replaced, reordered, removed and additional steps and/or system components may be inserted depending upon the needs of the particular application, and that the systems of the foregoing embodiments may be implemented using any of a wide variety of suitable processes and system components.

Having described at least one embodiment, other equivalent or alternative methods of deriving a high-protein powder/omega 3 oil and water from raw material of aquatic animals will be apparent to those skilled in the art. The present invention(s) are described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention(s).

TABLE 1

CERTIFICATE OF ANALYSIS AMINOGRAM
Sample Identification:
Sample #: 05-5432 Advance Protein Powder. Serving = 35 g
Method:
AL194: Elemental Scan (65) by ICP MS
Results:
Sample #05-5432

| Test Elemental | Result (mg/serving) | Result (ppm) |
|---|---|---|
| Lithium | <35 | <1 |
| Boron | <35 | <1 |
| Magnesium | 56,000 | 1,600 |
| Phosphorus | 220,000 | 6,400 |
| Calcium | 770,000 | 22,000 |
| Titanium | 77 | 2.2 |
| Chromium | 91 | 2.6 |
| Iron | 4,600 | 130 |
| Nickel | <35 | <1 |

TABLE 1-continued

CERTIFICATE OF ANALYSIS AMINOGRAM
Sample Identification:
Sample #: 05-5432 Advance Protein Powder. Serving = 35 g
Method:
AL194: Elemental Scan (65) by ICP MS
Results:
Sample #05-5432

| | | |
|---|---|---|
| Zinc | 2,070 | 59 |
| Germanium | <35 | <1 |
| Selenium | 91 | 2.6 |
| Strontium | 3,900 | 110 |
| Zirconium | <35 | <1 |
| Molybdenum | <35 | <1 |
| Rhodium | <35 | <1 |
| Silver | <35 | <1 |
| Indium | NA | NA |
| Antimony | <35 | <1 |
| Cesium | <35 | <1 |
| Lanthanum | <35 | <1 |
| Praseodymium | <35 | <1 |
| Beryllium | <35 | <1 |
| Sodium | 70,000 | 2,000 |
| Aluminum | 2,000 | 56 |
| Potassium | 190,000 | 5,500 |
| Scandium | <35 | <1 |
| Vanadium | <35 | <1 |
| Manganese | 120 | 3.3 |
| Cobalt | <35 | <1 |
| Copper | 160 | 4.7 |

| Test | Result (mg/serving) | Advance International Corporation Result (ppm) |
|---|---|---|
| Gallium | <35 | <1 |
| Arsenic | <35 | <1 |
| Rubidium | 49 | 1.4 |
| Yttrium | <35 | <1 |
| Niobium | <35 | <1 |
| Ruthenium | <35 | <1 |
| Palladium | <35 | <1 |
| Cadmium | <35 | <1 |
| Tin | <180 | <5 |
| Tellurium | <35 | <1 |
| Barium | 63 | 1.8 |
| Cerium | <35 | <1 |
| Neodymium | <35 | <1 |
| Samarium | <35 | <1 |
| Gadolinium | <35 | <1 |
| Dysprosium | <35 | <1 |
| Erbium | <35 | <1 |
| Ytterbium | <35 | <1 |
| Hafnium | <35 | <1 |
| Tungsten | <35 | <1 |
| Osmium | <35 | <1 |
| Platinum | <35 | <1 |
| Mercury | <35 | <1 |
| Thorium | <35 | <1 |
| Europium | <35 | <1 |
| Terbium | <35 | <1 |
| Holmium | <35 | <1 |
| Thulium | <35 | <1 |
| Lutetium | <35 | <1 |
| Tantalum | <35 | <1 |
| Rhenium | <35 | <1 |
| Iridium | <35 | <1 |
| Gold | <35 | <1 |
| Thallium | <35 | <1 |
| Bismuth | <35 | <1 |
| Uranium | <35 | <1 |

TABLE 2

CERTIFICATE OF ANALYSIS
Sample Identification
Sample #: 05-5432 Advance Protein Powder, Serving = 35 g
Method:
B0202: Amino Acid Profile (Total) by AOAC 98230
PB100 NLEA Abbreviated Nutrient Package (Proximate)
Results: OF AMINOGRAM Sample #05-5432

| Test | /100 g | Serving | Units | Theoretical Level |
|---|---|---|---|---|
| Protein - Food | 85.4 | 29.9 | grams | 85-90% |
| Protein = Nitrogen × 6.38 | | | | |
| Ash | 9.20 | 3.22 | grams | |
| Carbohydrates, Calculated | <1.00 | <0.35 | grams | |
| Calories, Calculated | 340 | 119 | calories | |
| Crude Fat By Acid Hydrolysis | 1.42 | 0.497 | grams | 0.5% |
| Moisture By Vacuum Oven | 7.68 | 2.69 | grams | |
| Total Amino Acid Profile | | | | |
| Tryptophan | 1.06 | 0.371 | grams | |
| Cystine | 0.83 | 0.291 | grams | |
| Methionine | 2.51 | 0.879 | grams | |
| Aspartic Acid | 4.58 | 1.6 | grams | |
| Threonine | 2.15 | 0.753 | grams | |
| Serine | 1.64 | 0.574 | grams | |
| Glutamic Acid | 6.64 | 2.32 | grams | |
| Proline | 1.89 | 0.662 | grams | |
| Glycine | 2.54 | 0.889 | grams | |
| Alanine | 2.9 | 1.015 | grams | |
| Valine | 2.31 | 0.809 | grams | |
| Isoleucine | 2.03 | 0.711 | grams | |
| Leucine | 3.51 | 1.23 | grams | |
| Tyrosine | 1.54 | 0.539 | grams | |
| Phenylalanine | 1.86 | 0.651 | grams | |
| Lysine, Total | 3.92 | 1.37 | grams | |
| Histidine | 1.22 | 0.427 | grams | |
| Arginine | 2.97 | 1.04 | grams | |

TABLE 3

CERTIFICATE OF ANALYSIS
Sample identification:
Sample #: 05-5432 Advance Protein Powder, Serving = 35 g
Method:
B0003: Customized Analyses (Pepsin (0.2%) Digestible Protein)
B7033: Cholesterol by Gas Chromatography (GC), AOAC 994.10
Q0201: Total Trans Fatty Acid by Gas
Chromatography (GC), AOAC 996.06
Results:
Sample #05-5432

| Test | /100 g | /Serving | Units |
|---|---|---|---|
| Pepsin (0.2%) Digestible Protein | 98.1 | 34.3 | grams |
| Total Trans Fatty Acid Isomers | 0.02 | 0.007 | grams |
| Cholesterol | 0.0173 | 0.00605 | grams |

TABLE 4

SUPPLEMENTAL FACTS
Serving Size 35 grams
Servings Per Container

| | Amount per Serving | % of Daily Value* |
|---|---|---|
| Calories | 120 | |
| Protein | 30 g | |
| Calcium | 770 mg | 77 |
| Iron | 5 mg | 28 |
| Magnesium | 56 mg | 14 |
| Zinc | 2.1 mg | 140 |
| Selenium | 0.1 mcg | 0 |
| Copper | 0.2 mg | 10 |
| Manganese | 0.1 mg | 5 |
| Chromium | 0.1 mcg | 0 |
| Sodium | 70 mg | 3 |
| Potassium | 190 mg | 5 |
| Isoleucine | 710 mg | ** |
| Leucine | 1.2 g | ** |
| Lysine | 1.4 g | ** |
| Methionine | 880 mg | ** |
| Cystine | 290 mg | ** |
| Phenylalanine | 650 mg | ** |
| Tryosine | 540 mg | ** |
| Threonine | 750 mg | ** |
| Valine | 810 mg | ** |
| Serine | 570 mg | ** |
| Glutamic Acid | 2.3 g | ** |
| Proline | 660 mg | ** |
| Glycine | 890 mg | ** |
| Alanine | 100 mg | ** |
| Histidine | 430 mg | ** |
| Arginine | 1.0 g | ** |

*Percent of Daily Values based on a 2000 calorie diet.
**Daily Value not established.

What is claimed is:

1. A system comprising:
   a first mill;
   a preparation tank constructed and arranged to receive milled material from the first mill and disposed downstream from the first mill, the preparation tank constructed and arranged to sanitize raw material from aquatic animals and to combine the raw material with an organic solvent to create a mixture, the preparation tank comprising a blending system;
   a source of sanitizing agent in communication with the preparation tank;
   a reactor located downstream of the preparation tank constructed and arranged to heat the mixture for a first time period and to heat a solid material, separated from a first liquid, of the mixture, for a second time period;
   an additive tank in communication with both the preparation tank and the reactor;
   a filter located downstream of the reactor constructed and arranged to separate a first liquid including said organic solvent, oil, water, and amine from the solid material in the mixture, and configured to separate a second liquid including said organic solvent, oil, water, and amine from the solid material;
   a second mill located downstream of the reactor constructed and arranged to grind the solid material; and
   a rotating oven located downstream of the second mill constructed and arranged to cure the ground solid material to produce protein powder;
   a liquid capture tank disposed downstream from the filter, the liquid capture tank constructed and arranged to receive liquid from the filter;
   a distillation tower disposed downstream from the liquid capture tank, distillation tower constructed and arranged to distill liquid received from the liquid capture tank;
   a water filter disposed downstream from the distillation tower, the water filter constructed and arranged to separate oil from water present in the liquid received from the distillation tower;

a water tank disposed downstream from the water filter; and an oil storage tank disposed downstream from the distillation tower;

wherein the reactor and filter are in communication in both the upstream and downstream directions such that the reactor is further constructed and arranged to heat material received from the filter, and the filter is further constructed and arranged to re-filter material received from the reactor, and wherein the reactor further comprises a blending system configured and arranged to homogenize the mixture, and one or more pumps configured and arranged to pump the mixture from the reactor to the filter.

2. The system of claim 1, wherein the preparation tank is rotatable.

3. The system of claim 1, wherein the reactor is rotatable.

4. The system of claim 1, wherein the reactor further comprises at least one of a valve and a sensor.

5. The system of claim 1, wherein the reactor is constructed and arranged to produce a magnetic field within the reactor to align molecules of the mixture.

6. The system of claim 5, wherein the reactor is further configured and arranged to apply electricity to the mixture within the reactor.

7. The system of claim 1, wherein the filter comprises a centrifuge.

8. The system of claim 1, wherein the filter comprises one or more of a centrifuge, filter or strainer.

* * * * *